United States Patent [19]

Park

[11] Patent Number: 4,831,448
[45] Date of Patent: May 16, 1989

[54] VIEWING DISTANCE SENSOR FOR TELEVISION RECEIVER

[75] Inventor: Chan W. Park, Kyungsangbook, Rep. of Korea

[73] Assignee: Goldstar Co., Ltd., Seoul, Rep. of Korea

[21] Appl. No.: 118,026

[22] Filed: Nov. 6, 1987

[30] Foreign Application Priority Data

Nov. 7, 1986 [KR] Rep. of Korea ............ 17324[U]

[51] Int. Cl.$^4$ ............ H04N 5/00; H04B 9/00
[52] U.S. Cl. ............ 358/188; 358/108;
358/113; 358/245; 340/555; 367/93; 367/95;
455/604
[58] Field of Search ............ 358/245, 194.1, 188,
358/93, 107, 113, 108; 455/603, 604, 352;
340/555; 367/93, 95

[56] References Cited

U.S. PATENT DOCUMENTS 4,417,278 11/1983 Hensleigh ............ 358/188

4,716,469 12/1987 Kim ............ 358/245

Primary Examiner—Tommy P. Chin
Attorney, Agent, or Firm—Birch, Stewart, Kolasch & Birch

[57] ABSTRACT

A viewing distance sensor for television receiver which cannot influence the remote infra-red control function over other electronic equipment positioned in the vicinity of a television receiver and also cannot be influenced by the infra-red signals transmitted from other electronic equipment. An infra-red signal is transmitted from the infra-red signal transmitter where a viewer is positioned within a viewable distance from the front of television receiver, whereby false operation caused by the infra-red signal from other equipment can be avoided. Also, an inhibiting control signal is applied to the screen controller of a television set where infra-red signals transmitted from other electronic equipments are received by the infra-red receiver in the television receiver, whereby false operation of the viewing distance sensor can be further avoided.

7 Claims, 1 Drawing Sheet

VIEWING DISTANCE SENSOR FOR TELEVISION RECEIVER

BACKGROUND OF THE INVENTION

1. Field of the Invention

The present invention relates to a viewing distance sensor for a television receiver, and more particularly to a proximity sensor which controls the transmission of infra-red signals for sensing the approach distance of a viewer according to a sensed state of the viewing distance.

2. Description of the Prior Art

In conventional proximity detection apparatus as shown in FIG. 2, if an infra-red signal is transmitted from the infra-red signal transmitter 31 installed in a television receiver at the front of the television receiver and is thereafter reflected by a viewer positioning at the front of the television receiver and is received at the infra-red signal receiver 32 installed in the television receiver, then the received infra-red signal is amplified by the preamplifier 33 in the infra-red receiver 32 which generates a control signal applied to the screen controller 34; and at this time a screen control signal is outputted at a terminal a by the screen controller 34 to interrupt an image signal on the screen of the television set.

However, such conventional apparatus has drawbacks in that it may influence the remote control operation of other electronic equipments responsive to infrared control installed in the vicinity of the television receiver because during the operation of the television receiver the infra-red signal transmitter transmits an infra-red signal may cause the faulty operation of other electronic equipments. Moreover, in such conventional apparatus, image signals on the television screen may be inhibited because it believes a viewer is adjacent the television receiver within a viewable distance, when in fact the infra-red signal is transmitted from infra-red signal transmitters in other electronic equipments and received by the infra-red signal receiver installed in the television receiver since the infra-red signal receiver always remains in the operation state during the operation of the television receiver.

OBJECT OF THE INVENTION

Accordingly, it is an object of the present invention to provide a viewing distance sensor for a television receiver which can influence the remote control of other infra-red signal responsive electronic equipments positioned in the vicinity of the television receiver and conversely also can not be influenced by the infra-red signals transmitted from other electronic equipments.

SUMMARY OF THE INVENTION

This object of the present invention is accomplished by synchronizing the operation of an infra-red signal transmitter with that of an infra-red signal receiver, to continuously transmit an infra-red signal from the infrared signal transmitter when a viewer is positioned within the predetermined distance, that is, a predetermined viewable distance from the front of television receiver while by stopping the transmission from the infra-red signal transmitter and at the same time inhibiting the input of a control signal into a screen controller of the television where the infra-red signal received at the infra-red signal receiver is not synchronized with the operation time period of the infra-red signal transmitter.

According to the present invention as described above, where an infra-red signal transmitted from an infra-red signal transmitter is determined that a viewer to is positioned within too short a viewable distance from the front of television receiver, false operation caused by infra-red signals from other electronic equipments can be avoided; and also a control input signal is not applied to the screen controller of the television where the infra-red signals transmitted from other electronic equipments are received by the infra-red signal receiver in the television receiver.

BRIEF DESCRIPTION OF THE DRAWINGS

These objects and features of the present invention will become more apparent from the following explanation of the present invention in connection with the accompanying drawings wherein.

DETAILED DESCRIPTION OF THE INVENTION

Figure 1:
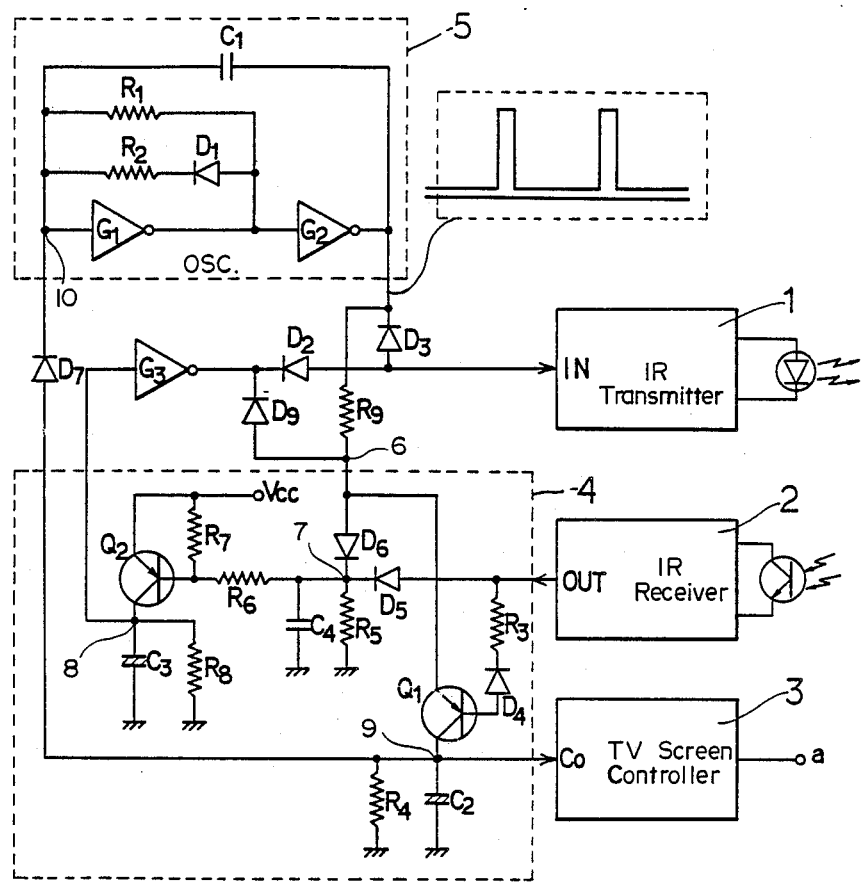
FIG. 1 is a schematic circuit diagram of the viewing distance sensor for television receiver according to the present invention.
Figure 2:
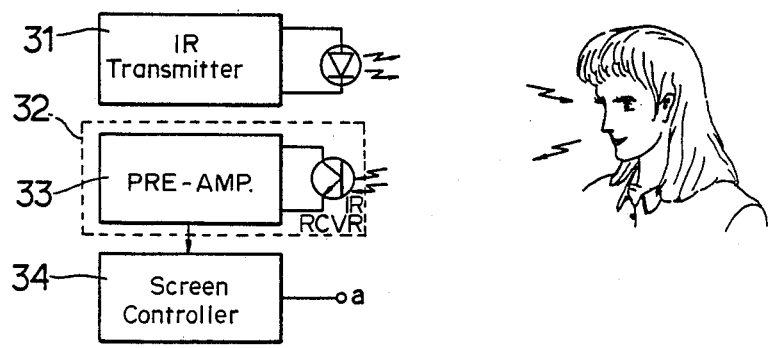
FIG. 2 is a schematic block diagram of the prior art viewing distance sensor.

Referring now to FIG. 1, which shows a schematic circuit diagram of the present viewing distance sensor, illustrated there is a viewing distance sensor for a television receiver wherein, when an infra-red signal transmitted from the infra-red signal transmitter 1 is reflected by a viewer, not shown, positioned in front of the television receiver and then received by the infra-red signal receiver 2, a control signal is outputted from the infrared signal receiver 2 and applied to the screen controller 3.

In the viewing distance sensor, a drive control terminal IN of said infra-red signal transmitter 1 is connected via the diode $D_3$ to an output terminal of the inverter $G_2$ which is at the output side of a rectangular-wave oscillator 5 comprising the inverters $G_1$ and $G_2$, the resistors $R_1$ and $R_2$, the diode $D_1$ and the capacitor $C_1$. Also said drive control terminal IN of said infra-red signal transmitter 1 is commonly connected via said diode $D_3$, the resistor $R_9$ and the diode $D_9$ and via the diode $D_2$ respectively to the output terminal of said inverter $G_3$.

Furthermore, in order to configure the signal determining section 4, an output terminal OUT of said infra-red signal receiver 2 and a connection node 6 of said resistor $R_9$ and said diode $D_9$ is commonly connected via the diodes $D_5$ and $D_6$ respectively to the resistor $R_5$ and the capacitor $C_4$, and this commonly connected node 7 is conected via the resistor $R_6$ to the resistor $R_7$ and the base of the transistor $Q_2$, the collector of which is connected to the resistor $R_8$ and the capacitor $C_3$. Further, the connection node 6 of said resistor $R_9$ and the diode $D_9$ is connected to the emitter of the transistor $Q_1$, the base of which is connected via the diode $D_4$ and the resistor $R_3$ to the output terminal OUT of said infrared signal receiver 2 and the collector of which is connected to the resistor $R_4$ and the capacitor $C_2$.

The present viewing distance sensor is further arranged to connect the common node 8 of the collector of the transistor $Q_2$, the resistor $R_8$ and the capacitor $C_3$ to the input terminal of said inverter $G_3$, and to connect the common node 9 of the collector of the transistor $Q_1$, the resistor $R_4$ and the capacitor $C_2$ to the control input terminal Co of said screen controller 3 and also to the control input circuit node 10 of said rectangular-wave oscillator 5 through the diode $D_7$.

In the viewing distance sensor of Figure I, the infra-red signal transmitter 1 interrupts its drive operation if a low level signal is applied to the drive control terminal IN thereof while the infra-red signal receiver 2 outputs a low level signal at the output terminal OUT thereof when an infra-red signal is received, and the screen controller 3 outputs a screen control signal at the terminal a when a high level signal is applied to the control input terminal Co for more than a predetermined time to interrupt the outputting of an image signal onto the screen of television. Further, the rectangular-wave oscillator 5 outputs a rectangular-wave oscillating signal as depicted on the upper side of FIG. 1 if a low level signal is applied to the input terminal of the inverter $G_1$ which is the control input stage thereof.

Hereinafter, the operation and working effect of the present invention configured as described above will be explained in detail.

If the rectangular-wave oscillating signal as depicted on the upper side of FIG. 1 is outputted by at the rectagular-wave ocillator 5, then at the high voltage level of the rectangular-wave oscillating signal the diode $D_3$ is turned off while at the low voltage level of same a low level signal is applied through the diode $D_3$ to the drive control terminal IN of the infra-red signal transmitter 1, to transmit an intermittent infra-red signal from the infra-red signal transmitter.

Further, in a state when an infra-red signal is not received by the infra-red signal receiver 2, a high level signal comprises the output at the output terminal OUT of said infra-red signal receiver 2. This high level signal turns off the diode $D_4$ to turn off the transistor $Q_1$, so that a low level signal is output at the collector of latter. Accordingly, the screen controller 3 is not driven, and the rectangular-wave oscillator 5 performs a normal oscillating operation.

Moreover, a high level signal output from the output terminal OUT of said infra-red signal receiver 2 charges the capacitor $C_4$ through diode $D_5$ to turn off the transistor $Q_2$, causing a low level signal to be output at the collector of same. This low level signal is applied to the input terminal of the inverter $G_3$, so that a high level signal is provided at the output terminal thereof which turns off the diodes $D_2$ and $D_9$.

In the state as described above, however, if a viewer is positioned within a viewable distance from the front of the television receiver so as to cause an infra-red signal to be received at the infra-red signal receiver 2, then a low level signal is output at the output terminal OUT of the infra-red signal receiver 2 to apply a low level signal into the base of the transistor $Q_1$. At this time a high level signal is output from the rectangular-wave oscillator 5 and is applied to the emitter of the transistor $Q_1$, so that the transistor $Q_1$ is turned on to output a high level signal at the collector thereof. This high level signal charges in the capacitor $C_2$ and then applied through the diode $D_7$ to the input terminal of the inverter $G_1$ in the rectangular-wave oscillator 5, thereby outputting a low level signal at the output terminal of the inverter $G_1$. In turn, this low level signal is applied to the input terminal of the inverter $G_2$, thereby outputting a continuous high level signal at the output terminal of the inverter $G_2$.

Accordingly, a continuous infra-red signal is transmitted from the infra-red signal transmitter 1. Thus, in this time a continuous infra-red signal is received by the infra-red signal receiver 2 to output a continuous low level signal at the output terminal OUT thereof, so that the transistor $Q_1$ remains in the conduction state to output a high level signal at the collector thereof and to apply same to the control input terminal Co of the screen controller 3.

If a high level signal is continuously applied to the control input terminal Co of the screen controller 3 for more than a predetermined time as described above, then a screen control signal is fed from the screen controller 3 into the terminal a, to interrupt the outputting of image signal to the television screen.

However, if a viewer withdraws beyond the viewable distance, the infra-red signal is not received by the infra-red signal receiver 2, so that a high level signal is again outputted at the output terminal OUT thereof to turn off the transistor $Q_1$. Thus, when the charged voltage on the capacitor $C_2$ is discharged to apply a low level signal into the control input terminal Co of the screen controller 3, a screen control signal is not output from the screen controller 3 to normally display the image signal on the screen of the television receiver. Also at this time a rectangular-wave oscillating signal is again generated by rectangular-wave oscillator 5 to transmit an infra-red signal from the infra-red signal transmitter 1 intermittently.

Meanwhile, if an infra-red signal generated by other electronic equipments located in the vicinity of television receiver is received by the infra-red signal receiver 2, then a low level signal is present at the output terminal OUT of the infra-red signal receiver 2. At this time, however, if this low level signal is not synchronized with the rectangular-wave oscillating signal of the rectangular-wave oscillator 5, then the low level signal outputted from the rectangular-wave oscillator 5 keeps the transistor $Q_1$ in the off state ($C_0=I_0$). In other words, when a low level signal is present at the output terminal OUT of the infra-red signal receiver 2, a low level signal is output from the rectangular-wave oscillator 5, then a low level signal is output at the connection node of each cathodes of the diodes $D_5$ and $D_6$ and this low level signal is applied through the resistor $R_6$ into the base of the transistor $Q_2$ to turn off it, thereby outputting high level signal at the collector thereof.

In turn, this high level signal is inverted to a low level signal by the inverter $G_3$ to turn on the diodes $D_2$ and $D_9$, so that the drive operation of the infra-red signal transmitter 1 is interrupted so as not to transmit an infra-red signal, and then a low level signal is applied to the emitter of the transistor $Q_1$ to keep the transistor $Q_1$ at the non-conduction state. Accordingly, in this time a high level signal can not be applied to the control input terminal Co of the screen controller 3.

According to the present invention, as described in detail above, in normal operation an intermittent infra-red signal is transmitted from the infra-red signal transmitter, thereby being able to dramatically reduce the influence an the infra-red control device by other electronic products installed in the vicinity of television receiver dramatically; and also when infra-red signals generated by other electronic products are received by the infra-red signal receiver, a control signal is not applied to the screen controller of television, thereby being able to prevent the false operation of the television screen controller caused by an infra-red signal controlling other electronic products.

It is understood by those skilled in the art that the foregoing description is a preferred embodiment of the disclosed device and that various change and modifications may be in the invention without departing from the spirit and scope thereof.

What is claimed is:

1. A proximity sensor for detecting a predetermined viewing distance in front of a television receiver having an infrared signal transmitter and an infrared signal receiver for receiving signals transmitted from said transmitter and reflected from a viewer within said viewing distance as well as possibly receiving infrared signals from other sources in the vicinity of the receiver, comprising:

TV screen controller means for controlling the application of an image signal generated by said television receiver to a screen thereof;

controlled oscillator means for providing an intermittent output signal in response to a first type input signal and a steady state output signal in response to a second type input signal coupled thereto;

said transmitter being responsive to said intermittent output signal of said controller oscillator means for transmitting an intermittent infrared signal and transmitting a steady state infrared output in response to said steady state output signal from said controlled oscillator means;

received infrared signal determining means including first circuit means coupled to and being responsive to both the output of said infrared receiver and said controlled oscillator means, and being operable to generate said first and second type input signals for said controlled oscillator means and said screen controller means, said first type input signal being generated when no reflected infrared signals transmitted from said transmitter and reflected by a viewer within said predetermined viewing distance is received by said receiver and said second type input signal being generated when reflected infrared signals transmitted from said transmitter and reflected by a viewer within said predetermined distance are received by said receiver, said screen controller means being further coupled to said first circuit means and being responsive to said second type input signal to interrupt the application of said image signal to the screen of the television receiver;

said signal determining means additionally includes second circuit means for inhibiting the transmission of infrared signals by said transmitter when infrared signals from said other sources and not synchronized with infrared signals transmitted by said transmitter are received by said receiver.

2. The proximity sensor as defined by claim 1 wherein said signal determining means includes means for interrupting the application of said image signal after a predetermined time period following generation of said second type input signal.

3. The proximity sensor as defined by claim 1 wherein said controlled oscillator includes an input terminal and an output terminal and wherein said first circuit means includes a first transistor having a pair of signal conduction electrodes and a control electrode, and wherein one of said signal conduction electrodes is coupled to said output terminal of said controlled oscillator means, the other of said pair of signal conduction electrodes is commonly coupled to said input terminal of said controlled oscillator means and said screen controller means and said control electrode is coupled to an output terminal of said infrared signal receiver.

4. The proximity sensor as defined by claim 3 wherein said transistor includes an emitter electrode, a collector electrode, and a base electrode, and wherein said one signal conduction electrode comprises said emitter electrode, said other signal conduction electrode comprises said collector electrode, and said control electrode comprises said base electrode.

5. The proximity sensor as defined by claim 3 and wherein said second circuit means includes a second transistor having a pair of signal conduction electrodes and a control electrode and wherein one of said pair of signal conduction electrodes is coupled back to an input terminal of said infrared transmitter, the other of said pair of signal conduction electrodes is coupled to a source of supply potential and said control electrode is coupled to an output terminal of said signal receiver and said output terminal of said controlled oscillator.

6. The proximity sensor defined by claim 5 wherein said second transistor includes an emitter electrode, a collector electrode, and a base electrode and wherein said one signal conduction electrode comprises said collector electrode, said other signal conduction electrode comprises said emitter electrode and said control electrode comprises said base electrode.

7. The proximity sensor as defined by claim 5 and additionally including signal inverter means coupled between said one signal conduction electrode of said second transistor and the input terminal of said infrared signal transmitter.

* * * * *